March 31, 1964   L. I. FREEDMAN ETAL   3,126,627
MULTI-USE PORTABLE APPLIANCE
Filed March 21, 1962   2 Sheets-Sheet 1
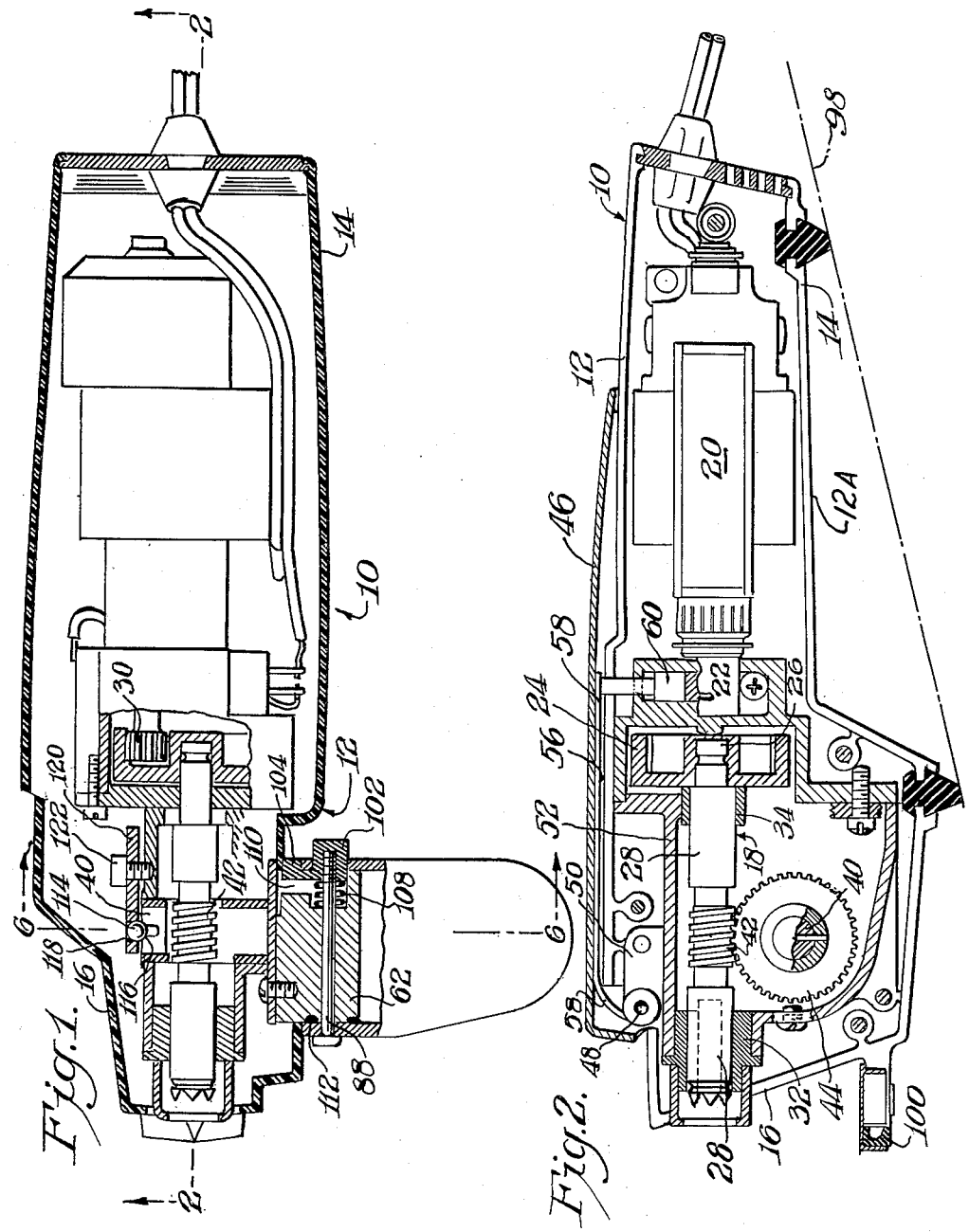
BY Connolly and Hutz
ATTORNEYS March 31, 1964 L. I. FREEDMAN ETAL 3,126,627
MULTI-USE PORTABLE APPLIANCE
Filed March 21, 1962 2 Sheets-Sheet 2
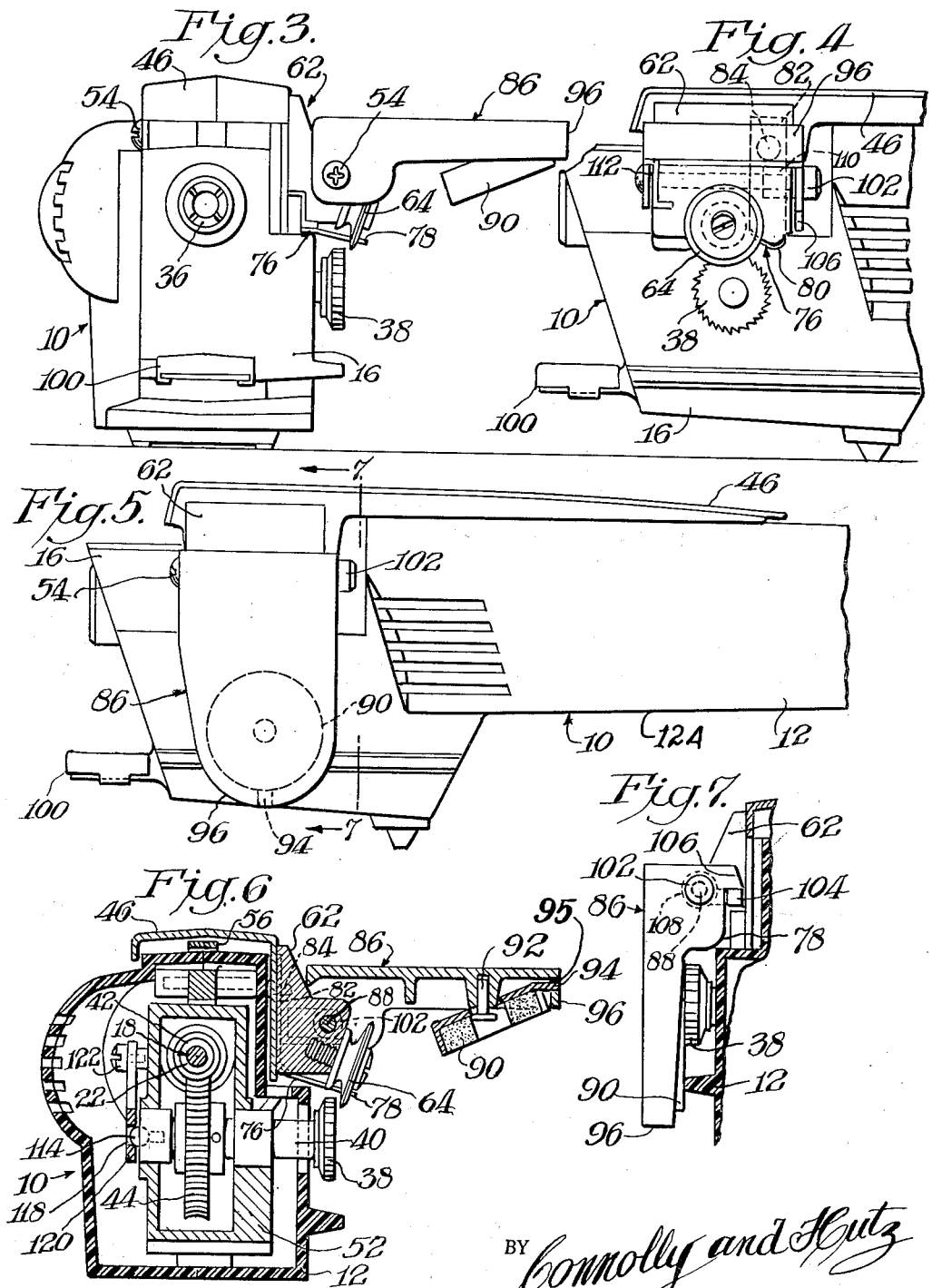

United States Patent Office   3,126,627
Patented Mar. 31, 1964

3,126,627
MULTI-USE PORTABLE APPLIANCE
Lawrence I. Freedman, John W. Tone, and Ernest S. Erickson, Wilmington, and Gustave A. Oberg, Claymont, Del., assignors to Ronson Corporation, Woodbridge, N.J., a corporation of New Jersey
Filed Mar. 21, 1962, Ser. No. 181,383
6 Claims. (Cl. 30—4)

This invention relates to a multi-use portable domestic appliance which is supported in use either in the hand or upon a flat surface, and it more particularly relates to such an appliance which can be used for severing the lids of cans.

An object of this invention is to provide a safe efficient and economical structure for a multi-use domestic portable appliance.

Another object is to provide such a structure for a portable appliance which is held in the hand while it is being used for opening cans, beating and whipping and which is supported upon a surface for other functions such as sharpening knives.

Novel features and advantages of the present invention will become apparent to one skilled in the art from a reading of the following description in conjunction with the accompanying drawings wherein similar reference characters refer to similar parts and in which:

FIG. 1 is a plan view partially broken away in cross-section of one embodiment of this invention;

FIG. 2 is a cross-sectional view taken through FIG. 1 along the line 2—2;

FIG. 3 is a front view in elevation of the embodiment shown in FIG. 1;

FIG. 4 is a fragmentary side view in elevation of the embodiment shown in FIGS. 1–3;

FIG. 5 is a fragmentary side view in elevation of the embodiment shown in FIGS. 1–4 in another disposition;

FIG. 6 is a cross-sectional view taken through FIG. 1 along the line 6—6; and

FIG. 7 is a cross-sectional view taken through FIG. 5 along the line 7—7.

In FIGS. 1–5 is shown the general external and internal configuration of a multi-use portable appliance 10 which can be used for a number of domestic functions including the severing of lids from cans, beating, whipping and sharpening knives. Appliance 10 includes an elongated casing 12 whose middle and rear portion 14 are small enough in cross section to provide a convenient handle 12A, and its front end 16 is enlarged to conveniently house a geared transmission head 18 which provides various power and suitable speed outlets. An electric motor 20 is mounted within the rear of casing 12, and its shaft 22 is connected to transmission head 18 through a set of step-down gears including an internal gear 24 mounted upon the rear end 26 of main transmission shaft 28 and a pinion gear 30 mounted upon front end of motor shaft 22. Main transmission shaft 28 is mounted within a pair of bearings 32 and 34, and its front end is bored to provide a tubular resilient socket 36 within which the shafts of various rotational attachments may be detachably inserted. These attachments include for example a stirrer of the type disclosed in copending commonly assigned design application RD-10 (Des. S.N. D-69,356, filed March 21, 1962) and a knife sharpener of the type described in copending commonly assigned design application RD-11 (Design S.N. D-69,365, filed March 21, 1962).

A can driving wheel 38 is mounted upon the side of casing front end 16 upon a shaft 40 connected to transmission head 18 by a worm gear 42 upon main transmission shaft 28 and a helical gear 44 upon shaft 40. Motor 20 for example rotates at a speed of approximately 20,000 r.p.m., and the gears to drive shafts 28 and 40 are selected to drive them at optimum speeds which for example respectively range from 2,000 to 4,000 r.p.m. and 60 to 150 r.p.m.

Handle or operating lever 46 is rotatably connected above casing 12, and its front end is rotatably mounted about pivot shaft 48 which is secured within boss 50 incorporated in the upper portion of housing 52 of the geared transmission. Pivot shaft 48 is for example provided by cap screw 54 shown in FIG. 3. A strip of substantially stiff spring material 56 is mounted under handle 46, and its front end is made in a form of a loop 58 which is secured under handle pin 48 and boss 50. The other end of spring strip 56 is substantially convexly formed to caused its free end 58 to be resiliently forced into contact with spring pushbutton type switch 60 when lever 46 is moved downwardly toward casing 12 as shown in FIGS. 2 and 5. This provides a convenient means for actuating switch 60 without direct contact by the rigid portion of lever 46. Spring 56 also reacts upwardly against lever 46 to maintain it ready for use in a position where switch 60 is inactivated.

As shown in FIGS. 4, 5 and 6, a mounting block 62 is secured to the side of lever 46. A round cutting blade 64 is rotatably mounted upon block 62 in an advantageous can-piercing and cutting disposition. A spring guide finger 76 is also mounted under mounting block 62 as shown in FIG. 3 with a substantially horizontal portion 78 inclined slightly downwardly in front elevation. The outer portion of finger 78 which contacts a can has a convexly curved cross section 80 to provide smooth guidance of the top of a can into engagement with driving wheel 38 to cause it to be severed by blade 64. Spring finger 76 is secured between block 62 and lever 46 by having its vertical extension 82 secured in a recess in block 62 by a screw 84. This mounting of spring finger 82 upon the side of the lever conveniently brings it into automatic contact with the top of a can together with cutter blade 64 when lever 46 is depressed and conveniently removes it from the top of a can together with round blade 64 when lever 46 is released.

A wing 86 is rotatably mounted upon mounting block 62 upon an axis of rotation provided by pin 88 shown in FIG. 1, which is parallel to the length of casing 12. Pin 88 permits wing 86 to flap up and down from the substantially folded position shown in FIGS. 5 and 7 to the horizontally extended position shown in FIGS. 1, 3 and 6. A lid grasping magnet 90 is loosely mounted upon pin 92 under wing 86, and a lug 94 extends from the magnet into engagement with slot 95 in the end of wing 86 to maintain magnet 90 inclined upwardly and outwardly for facilitating its lifting of severed lids from cans.

When wing 86 is in the downwardly folded vertical position shown in FIGS. 5 and 7, it has sufficient area to shield toothed drive wheel 38 whereby the appliance is rendered safe for operating attachments inserted within driving socket 36. An operator can therefore use this appliance with various beaters or a knife sharpening attachment inserted within the socket 36 in driving shaft 28 without any danger of being cut by blade 64 or drive wheel 38. When appliance 10 is being used for functions other than can-opening, such as sharpening knives with an attachment mounted upon its front end, it is rested upon a horizontal surface indicated by line 98 in FIG. 2, and in this position folded wing 86 protects the operator in a similar manner as that accomplished when appliance 10 is held in the hand. A loop 100 at the front end of casing 12 provides a means for conveniently hanging appliance 10 during storage.

In FIGS. 1 and 7 are shown pushbutton 102 secured to the end of pin 88 which includes a lug 104 for engaging projection 106 upon the side of wing 86 for maintaining it locked in the downwardly folded position shown in FIGS. 5 and 7. A coil spring 108 reacts between block 62 and pushbutton 102 within recess 110 for maintaining lug 104 releasably engaged with wing projection 106. A torsion spring 112 reacts between block 62 and wing 86 in a direction to urge wing 86 toward the horizontally open position; and when pushbutton 102 is depressed into recess 110, lug 104 disengages from projection 106 thereby allowing wing 86 to automatically spring upwardly to the horizontal position. When wing 86 is manually folded downwardly, lug 104 automatically locks under projection 106 to maintain wing 86 in the folded position shown in FIG. 7.

A thrust bearing for shaft 40 and spring tension are provided by the engagement of ball 114 between conical recess 116 in the end of shaft 40 and an aperture 118 in thrust plate 120 secured to housing 52 by cap screw 122.

What is claimed is:

1. A multi-use portable appliance comprising an elongated casing of a size convenient for being held in the hand, the cross section of the rear end of said casing being small enough to provide a convenient handle, an electric motor mounted within said rear end of said casing, a geared transmission mounted in the front end of said casing and connected to said motor, a can driving wheel mounted upon the side of the front end of said hand, the cross section of the rear end of said casing connecting said can driving wheel with said geared transmission, a driving shaft extending from said geared transmission through the front end of said casing having coupling means providing a means for connecting various attachments to said appliance, an operating lever mounted upon the top of said appliance, pivot means connecting the front end of said operating lever to the front end of said casing forward of said can driving wheel, a mounting block secured to the side of said lever above said wheel, cutting means mounted upon said block for cooperating with said wheel to sever the lid of a can when said lever is moved toward said casing, a wing mounted to swing upon said mounting block upon an axis disposed substantially parallel to the length of said casing that permits said wing to flap up and down from a substantially vertical folded to a horizontally extended position, a magnet mounted upon the lower surface of said wing for holding a severed lid when said wing is horizontally disposed, said wing being of sufficient length and width to shield said wheel when it is rotated to said substantially vertical folded position adjacent the side of said casing whereby said appliance is rendered safe for operating attachments engaged with said coupling means, and a switch upon the upper surface of said casing which is contacted by said lever to actuate said appliance when said lever is moved toward said casing.

2. An appliance as set forth in claim 1 wherein said lever includes a strip of spring material mounted upon the top of said geared transmission under said lever for resiliently contacting said switch to close it without direct contact by rigid portions of said lever, one end of said strip being secured under the pivoted end of said lever, and the other end of said strip being convexly disposed under said lever for causing said other end to resiliently contact said switch when said lever is moved down toward said casing.

3. An appliance as set forth in claim 1 wherein a spring guide finger is mounted under said mounting block to the rear of said cutting means to extend it substantially parallel to said wing, said spring guide finger extending outwardly and substantially horizontally with a slight downward inclination, and said spring guide finger including a upwardly directed substantially vertical extension which is secured between said mounting block and the side of said lever.

4. An appliance as set forth in claim 1 wherein said axis of said wing is provided by a pin inserted through said mounting block, a pushbutton being secured to one end of said pin, a projection upon the side of said wing, a lug being attached to one side of said pushbutton for engaging said projection for maintaining said wing locked in its downward position, resilient means reacting between said block and wing for urging said wing into its horizontal position, an axial clearance in said mounting block receiving said pushbutton and said lug in a position clear of said projection, and resilient means reacting between said mounting block and said pushbutton for maintaining said lug releasably engaged with said wing for locking it in said substantially vertical folded position.

5. An appliance as set forth in claim 1 wherein said magnet is loosely secured under said wing, a slot is formed in the outer end of said wing, and a lug extends from said magnet into engagement with said slot for maintaining said magnet inclined upwardly and outwardly for facilitating its lifting of a severed lid from a can.

6. An appliance as set forth in claim 1 wherein said transmission includes a main shaft, the front end of said main transmission shaft being bored to provide said driving shaft with said coupling means, the rear end of said main transmission shaft extending adjacent the shaft of said electric motor, a pair of step-down gears connecting said rear end of said main transmission shaft to said motor shaft for rotation of said main transmission shaft at an optimum rotational adapter speed, and a worm reduction gear connecting said main transmission shaft to said can driving wheel shaft for rotating said can driving disc at an optimum driving speed.

References Cited in the file of this patent

UNITED STATES PATENTS

| 2,789,345 | Klassen | Apr. 23, 1957 |
| 2,824,366 | Sarff | Feb. 25, 1958 |
| 2,825,963 | Sykes et al. | Mar. 11, 1958 |
| 2,850,799 | Dodd et al. | Sept. 9, 1958 |
| 2,883,745 | Bristol | Apr. 28, 1959 |
| 3,002,274 | Jepson et al. | Oct. 3, 1961 |